Feb. 21, 1950

F. C. HABERLAND 2,498,121

VALVE

Filed May 1, 1946

Inventor:
Frederick C. Haberland

Patented Feb. 21, 1950

2,498,121

UNITED STATES PATENT OFFICE 2,498,121

VALVE

Frederick C. Haberland, Cleveland, Ohio, assignor, by mesne assignments, to Borg-Warner Corporation, Chicago, Ill., a corporation of Illinois Application May 1, 1946, Serial No. 666,458

2 Claims. (Cl. 277—20)

My invention relates generally to valves and more particularly to a valve mechanism employing a plurality of valves for controlling the delivery of fluid under pressure to, and release of pressure from, a hydraulic cylinder of a fluid motor which is adapted to move a load.

Valve mechanisms have previously been made for such purposes but have proven unsatisfactory in operation because the valves employed to hold pressure in the hydraulic cylinder have failed satisfactorily to perform this function. It is therefore an object of my invention to provide a valve mechanism which operates to hold pressure in a hydraulic cylinder without leakage until it is desired to release the pressure in the cylinder to permit corresponding movement of the load.

It is another object of my invention to provide the simple but sturdy control device for operating the valves employed in the valve mechanism.

It is a further object to provide a valve mechanism of the foregoing type which is compact and which is constructed of a minimum number of parts.

Further objects and advantages of my invention will become apparent from a consideration of the following written description when taken in connection with the drawing in which.

In the drawing like reference numerals are employed in the several views to indicate like parts of the mechanism.

Figure 1:
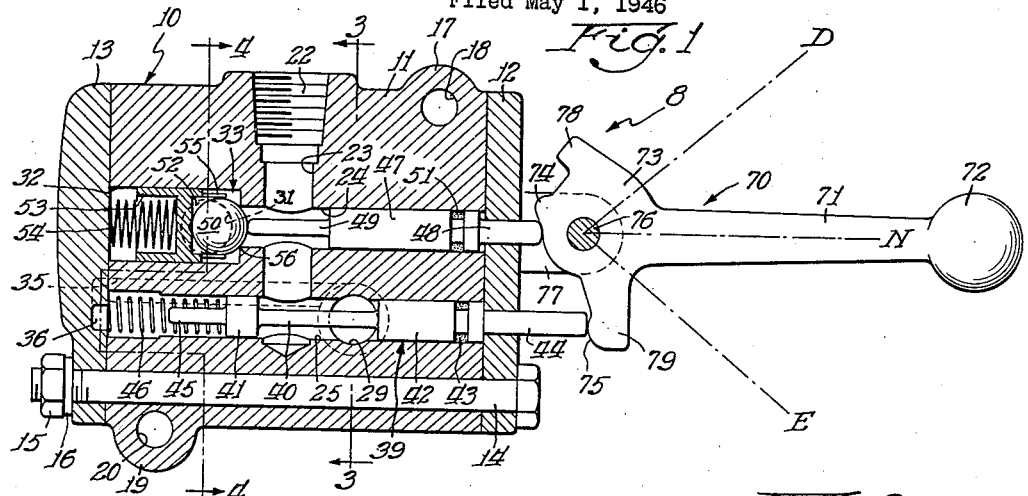
Fig. 1 is a sectional view of a valve mechanism embodying my invention taken along the planes of the line 1—1 in Fig. 4.

Referring now to the various figures of the drawing and particularly to Fig. 1, the numeral 8 indicates the valve mechanism in its entirety. This valve mechanism 8 has a housing indicated generally at 10 which includes a central section 11 which is closed at either end by a cover plate such as plates 12 and 13 which are joined to the central section 11 by three bolts 14 each of which has a nut 15 threaded on its end with a lock washer 16 interposed between the cover 13 and the nut 15. For mounting the valve mechanism 8 there are provided a boss 17 having a hole 18 drilled therethrough and a boss 19 having a hole 20 drilled therethrough.

The valve housing 10 has a fluid inlet port 22 which is internally threaded to receive a pipe (not shown) connectible with a source of fluid under pressure such as a pump (not shown). The inlet port 22 communicates with an inlet passageway 23 which in turn intersects passageways 24 and 25 which are parallel to each other, as shown in Fig. 1. As may be seen more clearly from Figs. 2 and 3, passageway 23 also intersects passageway 26 which leads to a pressure relief valve indicated generally at 27. Referring again to Figs. 2 and 3, there may be seen an exhaust port 28 which is internally threaded and which is in communication with an exhaust passageway 29 which leads in turn to the pressure relief valve 27. Externally of the valve mechanism 8, the exhaust port 28 may be connected, for example, with a return pipe and sump (not shown) whence the fluid is drawn by a pump (not shown) which delivers it to the inlet port 22. A pressure delivery port 30 (see Fig. 4) is threaded for connection, for example, to a hydraulic cylinder of a fluid motor (not shown) which is adapted to operate upon a load. Said port 30 communicates with a pressure delivery passageway 31 which connects with the enlarged portion 32 of the passageway 24. A valve indicated generally at 33 is interposed between passageways 31 and 24 at that point where passageway 24 increases in diameter, as may be seen in Fig. 1.

Positioned in passageway 25 is a spool valve indicated generally at 39. Valve 39 has a reduced portion 40 extending between the flanged portions 41 and 42 and has a seal ring 43 to prevent leakage outwardly to the cover plate 12. An extension 44 on the valve 39 passes through a hole in the cover plate 12 for a purpose to be described more fully hereinafter. An extension 45 on the left hand end of said valve, as viewed in Fig. 1, limits movement of the spool valve 39 toward cover plate 13. A spring 46 is interposed between the flanged end 41 of valve 39 and the cover plate 13 so that valve 39 is normally positioned in what will be referred to as its "open position" wherein the reduced portion 40 of the valve 39 is so located in passageway 25 as to permit free communication between inlet passageway 23, passageway 25 and exhaust passageway 29.

A passageway 35 (see Figs. 2 and 3) opens into the exhaust passageway 29 and extends therefrom into a channel 36 in the cover plate 13 which in turn communicates (see Fig. 1) with the left end of passageway 25 in the housing member 11. The purpose of passageway 35 and channel 36 is to permit the passage to the exhaust port 28 of any fluid trapped to the left of flange 41 of valve 39 when said valve is shifted to the left, as viewed in Fig. 1.

An operating member 47 is positioned in passageway 24 and is slidable in said passageway. Operating member 47 has an extension 48 of reduced diameter which passes outwardly of the valve mechanism 10 through the cover plate 12 and has an extension 49 at the other end of said operating member which is of reduced diameter so as not to close off the flow of fluid in passageways 23 and 24. Extension 49 normally abuts ball 50 of the ball check valve 33. A sealing ring 51 carried by the operating member 47 prevents the flow of fluid outwardly from passageway 24 to the cover plate 12.

Ball check valve 33 comprises the ball 50, its carriage member 53 which is slidable in enlarged end 32 of passageway 24, and a spring 54 which is interposed between the carriage 53 and the cover plate 13 normally to load ball check valve 33 to closed position on seat 56, as shown in Fig. 1. The carriage 53 is slotted as at 55 to permit fluid to pass into the space 52 between the ball 50 and carriage 53.

Figure 2:
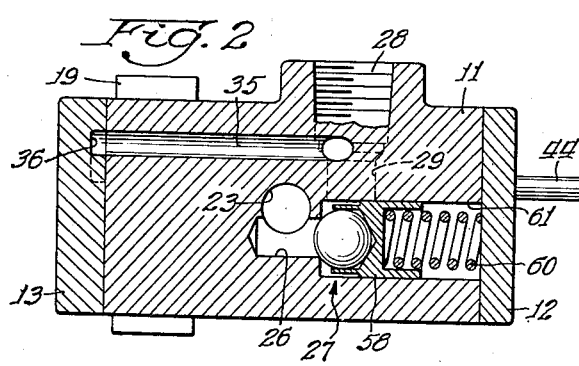
Fig. 2 is a sectional view of the same valve mechanism taken on the planes of the line 2—2 of Fig. 3.
Figure 3:
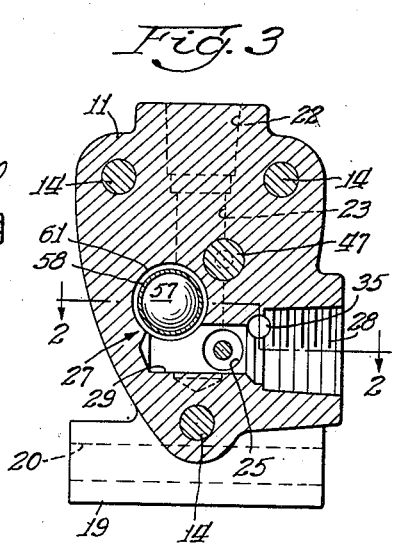
Fig. 3 is a sectional view of the valve mechanism of Fig. 1 taken on the plane of line 3—3 of Fig. 1.
Figure 4:
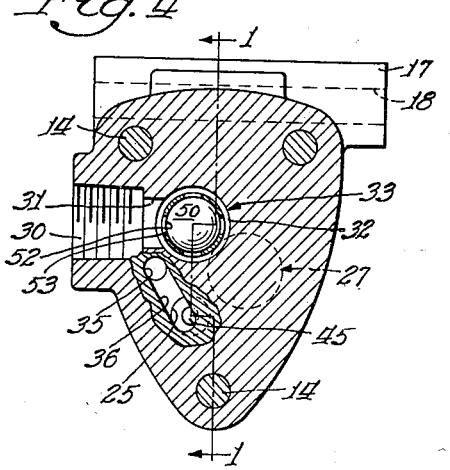
Fig. 4 is a sectional view of the valve mechanism of Fig. 1 taken on the planes of the line 4—4 of Fig. 1.

Pressure relief valve 27 which is shown most clearly in Figs. 2 and 3 comprises a ball 57, a carriage 58 therefor and a spring 60 interposed between the carriage 58 and the cover plate 12 normally to position the pressure relief valve 27 in its closed position as shown in Fig. 2 and to maintain it in said position until a pressure in excess of that desired in operation of the hydraulic cylinder or other device connected with the pressure delivery port 30 is reached. Carriage 58 is slidable in the enlarged portion 61 of passageway 26.

The control means, indicated generally at 70, for operating the ball check valve 33 and the spool valve 39 is carried by the cover plate 12. This control means comprises a lever 71 having a grip 72 at one end and an enlarged end 73 which carries cams 74 and 75 for acting respectively upon the extension 48 of operating member 47 and the extension 44 of spool valve 39. The lever 71 is mounted on and rotatable about a shaft 76 which is carried between a pair of lugs such as lug 77 connected with cover plate 12. It will be seen that lever 71 is rotatable about shaft 76 to move valves 33 and 39 from their normal spring-loaded positions when the lever is shifted respectively to the position indicated by the dot-dash line D or the dot-dash line E. The dot-dash line N indicates the neutral position of the lever 71 and is the position in which it is shown in Fig. 1 wherein the valves 33 and 39 are located by their springs 54 and 46 in their respective closed and open positions.

Considering now the operation of the valve mechanism 8 it will be seen that with the control lever 71 in its neutral position, as shown in Fig. 1, fluid will be delivered to inlet port 22 whence it will flow through inlet passageway 23 to the passageway 25 and thence to exhaust passageway 29 and the exhaust port 28. Fluid will not flow through passageway 24 since it is blocked therein by the actuating member 47 and its seal ring 51 at one end and by the ball check valve 33 at the other end.

When the control lever 71 is shifted to the position indicated by the dot-dash line E, the cam 75 on the enlarged end 73 of lever 71 will act against the extension 44 to move the spool valve 39 toward the left, as viewed in Fig. 1, to thereby close off the flow of fluid from passageway 25 into the exhaust passageway 29. As a result, the continued delivery of fluid to the inlet port 22 will cause a building up of pressure in passageways 23, 24 and 25 whereupon the force of spring 54, which acts to close ball check valve 33, will be overcome and the valve will open to permit the flow of fluid to the pressure delivery passageway 31 and port 30. If the pressure delivery port is connected with a fluid motor, the piston of said motor will then move a load which may be connected therewith. If, for example, fluid under pressure is delivered to the pressure delivery port 30 for such a period of time as to build up an excessive pressure within the fluid motor (not shown) and consequently in passageways 23, 24, 25 and 26, said pressure will overcome the force exerted by spring 60 of the pressure relief valve 27 to unseat the valve and permit a flow of fluid under pressure from inlet passageway 23 to passageway 26 and thence past the valve 27 to the exhaust passageway 29 and the port 28.

When fluid under pressure ceases to be delivered at the same rate to inlet port 22 either by reason of the delivering means, such as a pump, slowing down or stopping or by reason of lever 71 being moved toward its neutral position to permit flow of fluid under pressure to the exhaust port 28, the pressure in passageway 31, together with the force exerted by spring 54 on carriage 53, acts to close the valve 33 by pushing ball 50 onto its seat 56 thereby maintaining the fluid under pressure in the pressure delivery passageway 31 and in any instrumentality connected therewith. By using a spherical ball and a circular valve seat therefor, it is possible to maintain the fluid under pressure in passageway 31 without leakage.

When the control lever 71 is shifted from its neutral position or from the position indicated by the dot-dash line E to the position indicated by the dot-dash line D, cam 75 moves away from extension 44 of spool valve 39 so that the valve will be shifted to the right, as viewed in Fig. 1, by the spring 46, thus connecting passageways 23 and 25 with the exhaust passageway 29. When the lever 71 is shifted to position D, cam 74 on the enlarged end 73 of lever 71 will act against the extension 48 of the operating member 47 to shift said member to the left, as viewed in Fig. 1, to open the ball check valve 33 by reason of the extension 49. Fluid under pressure in passageway 31 may then flow past valve 33 to passageways 24 and 23 and thence through passageway 25 to the exhaust passageway 29. The reduction of pressure in the pressure delivery passageway 31 may be stopped by a return of the valve lever 71 to its neutral position, whereupon spring 54 and the pressure in passageway 31 reseat ball 50 on the valve seat 56.

Control lever 71 cannot be moved beyond its position indicated by the dot-dash line D by reason of a stop member 78 which engages the surface of cover plate 12. Likewise, the lever 71 cannot be moved from its neutral position to a position beyond that indicated by the dot-dash line E by reason of the stop 79, adjacent cam 75, which engages the surface of cover plate 12. It will be seen that the disposition of cams 74 and 75 is such that only one will be operable at a time.

Although I have described and illustrated a preferred embodiment of my invention, it is to be understood that I do not intend to be limited to such construction since certain changes and modifications may be made therein without departing from the scope of my invention as defined in the appended claims.

I claim:

1. In a valve mechanism including, means defining a housing having a fluid inlet port, a fluid exhaust port, a fluid pressure delivery port adapted to be connected with a pressure responsive load, and passageway defining means within said housing interconnecting said ports; a first valve in said passage positioned between said inlet port and said exhaust port, means biasing said first valve toward open position for normally placing said inlet port in communication with said exhaust port, said first valve being further characterized by the provision of means effective to balance the same against the influence of fluid pressure in communication therewith in all positions thereof; a second valve in communication with said passage at a position located between the said pressure delivery port and said inlet port as well as being at a position between said inlet port and said exhaust port, means biasing said second valve toward closed position to thus maintain pressure on said pressure responsive load; and control means for selectively operating said valves, said control means having a first position effective to cause said first valve to open and permit flow of fluid from the inlet port to said exhaust port, said control means having a second position effective to actuate said first valve to close communication through said exhaust port to thus permit the pressure to build up and open said second valve with the resultant delivery thereby of pressure fluid to said pressure responsive load and said control means having a third position effective to open both said second valve and said first valve to thus interconnect said pressure delivery port and said exhaust port for the return of fluid from said pressure responsive load.

2. In a valve mechanism adapted to control the delivery and return of pressure liquid to and from a pressure responsive work performing piston including, means defining a valve housing having an inlet port adapted to be supplied from a continuous source of liquid pressure, an exhaust port adapted to be placed in communication with a return line, and a liquid pressure delivery port adapted to be connected with said pressure responsive work performing piston, passage defining means interconnecting said ports; means defining a first, spool valve having a first piston portion connected with a second spaced piston portion by a reduced stem, said reduced stem being in continuous communication with said passage defining means, the opposed piston surfaces of said first and second pistons being effective to balance said first valve against the influence of the liquid pressure acting in opposite directions thereon in all positions of said valve, said second piston portion being adjustable into and out of position to close and open communication through said exhaust port, means biasing said first valve toward open position to thus place said inlet port and said exhaust port in communication; a second valve in communication with said passage defining means at a position closer to said inlet port than the position of said exhaust valve, said second-named valve comprising a ball check, a generally tubular cage for said ball check, said cage being provided externally with guide surfaces and a guideway in said housing for guiding said cage, resilient means biasing said cage and ball toward closed position wherein said ball check is effective to maintain pressure liquid on said pressure responsive work piston, means defining a reciprocable pin effective when operated in one direction to engage said ball check and move the same together with said cage in a direction opening communication between said delivery port and said passage defining means for causing the return of pressure liquid from said work piston; a control lever pivotally supported on said housing and having cam means carried thereby for operating said first valve, and for operating said pin for moving said second valve, said lever having a first position in which said cam means permits said first valve to open and said second valve to close to hold pressure on said work piston, said lever having a second position in which said cam means is effective to move said second piston portion of said first valve into position to close communication through said discharge port and permit pressure to be built up in communication with said check as a result of continued delivery from said pressure source whereupon said check and said guide cage are moved in response to pressure to open communication through said delivery port to said work piston, said control lever being operable to a third position wherein wherein said cam means is effective to operate said pin to engage said ball check to move said ball check and cage to thus place said cylinder in communication with said passage defining means while at the same time permitting said second piston portion of said first-named valve to remain in a position placing said passage defining means in communication with said discharge port to effect the return of pressure fluid from said work piston.

FREDERICK C. HABERLAND.

REFERENCES CITED

The following references are of record in the file of this patent:

UNITED STATES PATENTS

| Number | Name | Date |
| --- | --- | --- |
| 1,721,290 | Badertscher | July 16, 1929 |
| 1,791,901 | McIntyre | Feb. 10, 1931 |
| 1,895,477 | McCune | Jan. 31, 1933 |
| 1,925,496 | Nichols | Sept. 5, 1933 |
| 1,993,195 | Temple | Mar. 5, 1935 |